United States Patent
Shin et al.

(10) Patent No.: US 7,267,165 B2
(45) Date of Patent: Sep. 11, 2007

(54) HEAT EXCHANGER OF VENTILATING SYSTEM

(75) Inventors: Soo-Yeon Shin, Kyungsangnam-Do (KR); Seong-Hwan Lee, Kyungsangnam-Do (KR); Min-Chul Cho, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/536,956

(22) PCT Filed: Dec. 2, 2002

(86) PCT No.: PCT/KR02/02263

§ 371 (c)(1),
(2), (4) Date: May 31, 2005

(87) PCT Pub. No.: WO2004/051170

PCT Pub. Date: Jun. 17, 2004

(65) Prior Publication Data

US 2006/0060337 A1    Mar. 23, 2006

(51) Int. Cl.
*F28F 3/04* (2006.01)

(52) U.S. Cl. .................. 165/166; 165/164

(58) Field of Classification Search .......... 165/164, 165/166, 167
See application file for complete search history.

(56) References Cited

U.S. PATENT DOCUMENTS

| | | | | |
|---|---|---|---|---|
| 2,511,084 A | * | 6/1950 | Shaw | 165/166 |
| 2,571,631 A | * | 10/1951 | Trumpler | 165/166 |
| 2,959,400 A | * | 11/1960 | Simpelaar | 165/166 |
| 4,572,766 A | * | 2/1986 | Dimitriou | 165/167 |
| 5,125,453 A | * | 6/1992 | Bertrand et al. | 165/153 |
| 5,228,515 A | * | 7/1993 | Tran | 165/166 |
| 5,730,213 A | * | 3/1998 | Kiser et al. | 165/148 |
| 5,931,219 A | * | 8/1999 | Kull et al. | 165/166 |
| 6,892,806 B2 | * | 5/2005 | Pantow et al. | 165/179 |
| 6,935,418 B1 | * | 8/2005 | Valaszkai et al. | 165/177 |
| 7,055,586 B2 | * | 6/2006 | Sakakibara et al. | 165/158 |
| 2002/0005280 A1 | | 1/2002 | Wittig et al. | |

FOREIGN PATENT DOCUMENTS

| | | | |
|---|---|---|---|
| GB | 1336448 A | | 11/1973 |
| GB | 2159265 | * | 11/1985 |
| JP | 52-35655 | | 3/1977 |
| JP | 55-041336 A | | 3/1980 |
| JP | 62225894 A | | 10/1987 |

* cited by examiner

*Primary Examiner*—Teresa J. Walberg
(74) *Attorney, Agent, or Firm*—Birch, Stewart, Kolasch & Birch, LLP

(57) ABSTRACT

A heat exchanger of a ventilating system, including heat exchange plates which are laminated at a predetermined interval and divide an outdoor air path through which outdoor air passes and an indoor air path through which indoor air passes, and a plurality of embossing protrusions which are formed on the outdoor air path divided by the heat exchange plates, for generating turbulence in the outdoor air which flows in the outdoor air path, can improve heat transfer performance by controlling development of a boundary layer by differentiating structure of the air flow of an air path through which indoor air passes and an air path through which outdoor air passes.

13 Claims, 6 Drawing Sheets

HEAT EXCHANGER OF VENTILATING SYSTEM

TECHNICAL FIELD

The present invention relates to a ventilating system for exchanging indoor air and outdoor air and particularly, to a heat exchanger of a ventilating system, capable of improving heat exchanging capability between outdoor air which is flowed from the outdoor to the indoor and indoor air which is discharged from the indoor to the outdoor.

BACKGROUND ART

Generally, a ventilating system is a system for discharging polluted indoor air to the outdoor and sucking fresh outdoor air to the indoor, and the system includes an air cleaner for removing dust and foreign materials contained in the outdoor air, and a heat exchanger for transferring heat of the discharged indoor air to the sucked outdoor air.

FIG. 1 is a perspective view showing a conventional ventilating system.

The ventilating system includes a case 2 which is mounted on a wall for dividing indoor and outdoor, ventilating fans 4 and 6 which are mounted in the case 2, for ventilating air which is sucked and discharged, an air cleaner (not shown) which is installed in a portion to which the outdoor air inside the case 2 is sucked, for cleaning the outdoor air sucked to the indoor, and a heat exchanger 8 which is positioned inside the case 2, for performing a heat exchanging operation of indoor air discharged the outdoor and outdoor air sucked to the indoor.

Here, the case 2 is disposed in a hole formed on the wall for diving the indoor and outdoor, and accordingly, one side is positioned indoors and the other side is positioned outdoors. At this time, an outdoor suction hole 10 to which outdoor air is sucked and an indoor discharging hole 12 through which indoor air is discharged to the outdoor are respectively formed on the side wall of the case 2 positioned outdoors, and an indoor discharging hole 14 through which outdoor air is discharged to the indoor and an indoor suction hole 16 to which indoor air is sucked are respectively formed on the side wall of the case 2 positioned indoors.

The ventilating fans 4 and 6 includes a discharging ventilating fan 4 which is installed in a position connected with the outdoor discharging hole 12, for providing a ventilating pressure for discharging the indoor air to the outdoor, and a suction ventilating fan 6 which is installed in a position connected with the indoor discharging hole 14, for providing a ventilating pressure for sucking the outdoor air to the indoor.

FIG. 2 is a perspective view showing a conventional heat exchanger of a ventilating system, and FIG. 3 is a partial perspective view showing the conventional heat exchanger of a ventilating system.

The conventional heat exchanger 8 includes a plurality of base plates 20 which are laminated at a regular interval in a shape of a thin plate, first corrugation plates 22 which are respectively laminated in the spaces among the base plates 20, through which indoor air passes, and second corrugation plates 24 which are respectively laminated in the base plates 20 to be mutually at right angles to the first corrugation plates 22 in turn, through which outdoor air passes.

Here, the first and second corrugation plates 22 and 24 are curved in a triangular shape, and indoor and outdoor air passes to the inner and outer sides thereof, thus to mutually exchange heat.

Such heat exchanger 8 is formed in a rectangular shape by sequentially laminating the first corrugation plates 22, base plates 20, and second corrugation plates 24. The upper and lower surfaces of the heat exchanger 8 are respectively closed by the base plate 20, and the both side surfaces of the heat exchanger are connected with the outdoor suction hole 10 and indoor discharging hole 14, and outdoor air passes therethrough. Another both side surfaces of the heat exchanger are respectively connected with the outdoor discharging hole 12 and indoor suction hole 16, and indoor air passes therethrough.

That is, as the outdoor air which passes the first corrugation plates 22 and indoor air which passes the second corrugation plates 24 pass while being crossed with each other, heat exchange is performed by transferring heat of the indoor air through the base plates 20.

The operation of the conventional heat exchanger for the ventilating system with the above composition will be described as follows.

When the sucking ventilating fan 6 is driven, the outdoor air is sucked to the outdoor suction port 10 and is supplied to the indoor through the indoor discharging hole 14 by passing the first corrugation plate 22. When the discharging ventilating fan 4 is driven, the indoor air is sucked to the indoor suction hole 16 and discharged to the indoor through the outdoor discharging hole 12 by passing the second corrugation plate 24.

Here, as the outdoor air passing in the first corrugation plate 22 and indoor air passing the second corrugation plate 24 flow while being crossed with each other, heat in the indoor air is transferred to the outdoor air through the base plate 20, and the outdoor air which sucked the heat of the indoor air is supplied to the indoor.

As described above, since heat in the discharged indoor air is sucked to the outdoor air and discharged to the indoor, rapid temperature change of the indoor air can be prevented in case of operating ventilation.

However, in the conventional heat exchanger of the ventilating system, the first and second corrugation plates 22 and 24 are formed in a shape of a plate having a corrugation of a predetermined shape, and a boundary layer S is developed as the air flowing in the first and second corrugation plates moves along from the inlet side to the outlet side. Therefore, heat transfer efficiency is degraded and indoor temperature is rapidly changed in case of ventilating since the outdoor air sucked to the indoor could not absorb heat in the indoor air. Also, energy consumption for recovering the indoor air is increased and indoor air conditioning performance is degraded.

That is, as shown in FIG. 4, particles of viscous air which flow inside a pipe of the first and second corrugation plates 22 and 24 stick on the surface contacted on a surface of the inside of the pipe when the viscous air flows on the surface of the inside of the pipe. As the air gets apart from the surface of the inside of the pipe, the air recovers the speed and gains a speed of a free flow in a position at a predetermined distance from the surface of the solid material. At this time, as the air is get apart from the surface of the inside of the pipe, a boundary layer S is formed.

As described above, as the air flowing on the surface of the inside of the pipe is processed, the boundary layer is developed and the air gets apart from the surface of the inside of the pipe, thus to degrade heat transfer efficiency that the heat of the indoor air is transferred to the outdoor air through the base plate 20.

DISCLOSURE OF THE INVENTION

Therefore, an object of the present invention is to provide a heat exchanger of a ventilating system, capable of improving heat transfer performance by controlling development of a boundary layer by differentiating structure of the air flow of an air path through which indoor air passes and an air path through which outdoor air passes.

To achieve these and other advantages and in accordance with the purpose of the present invention, as embodied and broadly described herein, there is provided a heat exchanger of a ventilating system, including a heat exchange plates which are laminated at a predetermined interval and divide an outdoor air path through which outdoor air passes and an indoor air path through which indoor air passes, a plurality of embossing protrusions which are attached on the outdoor air path divided by the heat exchange plates, for generating turbulence in the outdoor air which flows in the outdoor air path and a corrugation plate which is positioned in the indoor air path, for securing a space through which the indoor air passes.

A partition for preventing inflow of indoor air into the outdoor air path is attached on the both side surfaces of the outdoor air path on which the embossing protrusion of the heat exchanger is attached.

The embossing protrusion of the heat exchanger is formed in a convex shape having a predetermined height being attached on the upper surface of the heat exchange plate.

The embossing protrusions of a first row is aligned at a predetermined interval at the front of the heat exchange plate, embossing protrusions of a second row is aligned at a predetermined interval at the rear of the embossing protrusions of the first row, the embossing protrusions of the first row and the second row are sequentially aligned, and the embossing protrusions are respectively positioned in spaces among the embossing protrusions of the first row.

The heat exchanger of the ventilating system in accordance with the present invention includes a heat exchange plate for dividing an outdoor air path through which outdoor air passes and an indoor air path through which indoor air passes, which are laminated at a predetermined interval, a corrugation plate which is attached on the outdoor air path which is divided by the heat exchange plates, for securing a space through which the outdoor air passes and a plurality of embossing protrusions which are positioned in the indoor air path, for generating turbulence in the indoor air flowing in the indoor air path.

The heat exchanger of the ventilating system in accordance with the present invention includes a heat exchanging plate which is laminated at a predetermined interval and divides an outdoor air path through which outdoor air passes and an indoor air path through which indoor air passes, a plurality of outdoor embossing protrusions which are attached on the outdoor air path divided by the heat exchange plates, for generating turbulence in the outdoor air which flows in the outdoor air path and a plurality of indoor embossing protrusions which are positioned in the indoor air paths, for generating turbulence in the indoor air which flows in the indoor air path.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Reference will now be made in detail to the preferred embodiments of the present invention, examples of which are illustrated in the accompanying drawings.

As the embodiment of the heat exchanger of the ventilating system in accordance with the present invention, there can be a plurality of them, and hereinafter, the most preferable one will be described.

Figure 5:
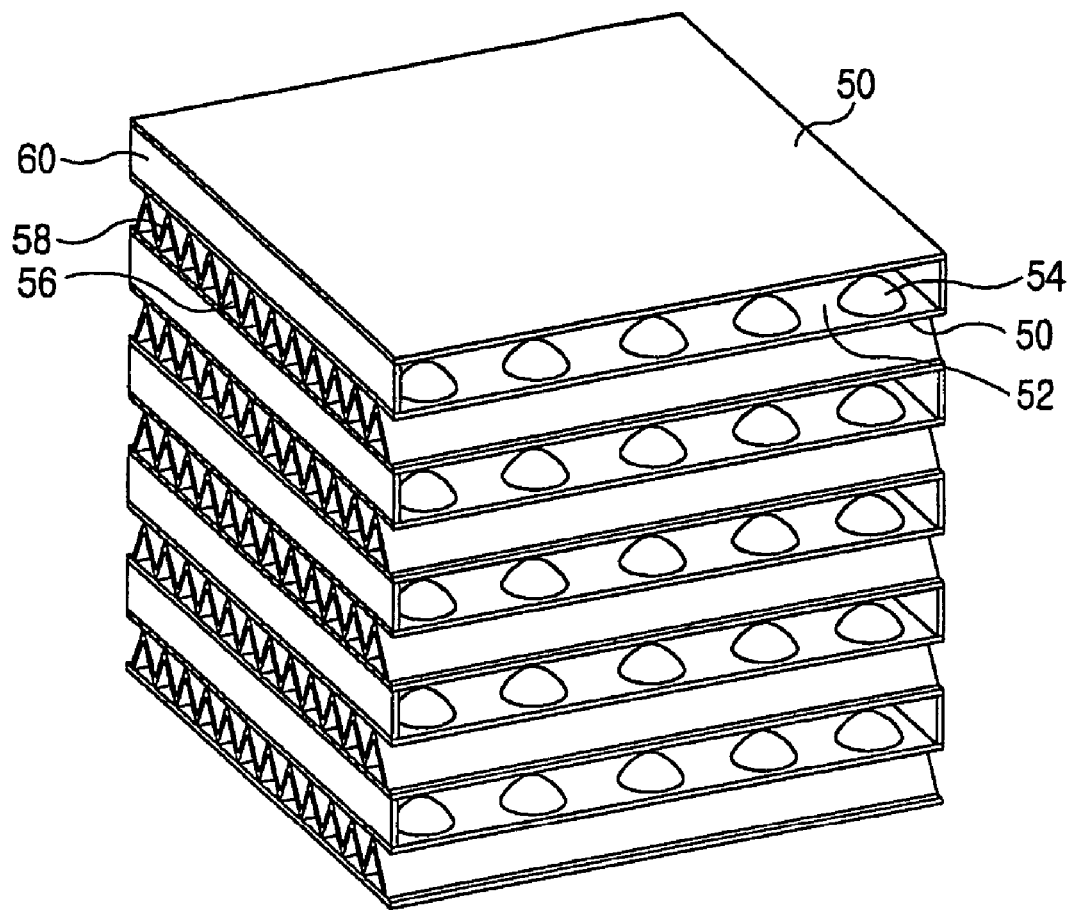
FIG. 5 is a partial perspective view showing a heat exchanger of a ventilating system in accordance with the present invention.

FIG. 5 is a perspective view showing a heat exchanger of a ventilating system in accordance with the present invention.

Figure 1:
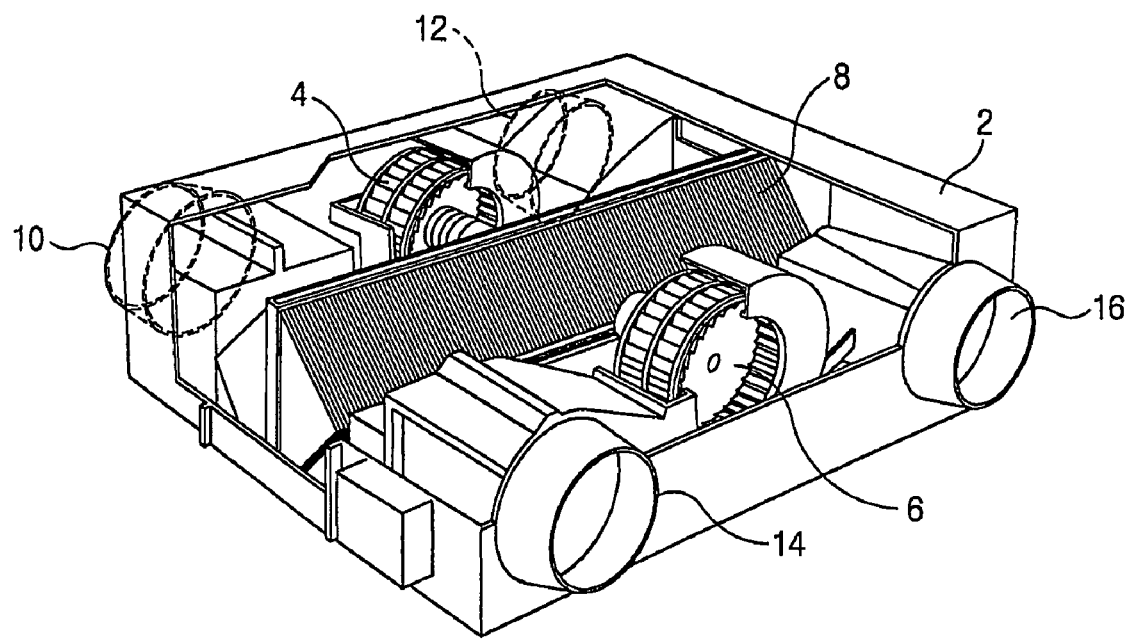
FIG. 1 is a partially cut perspective view showing the structure of a general ventilating system.
Figure 2:
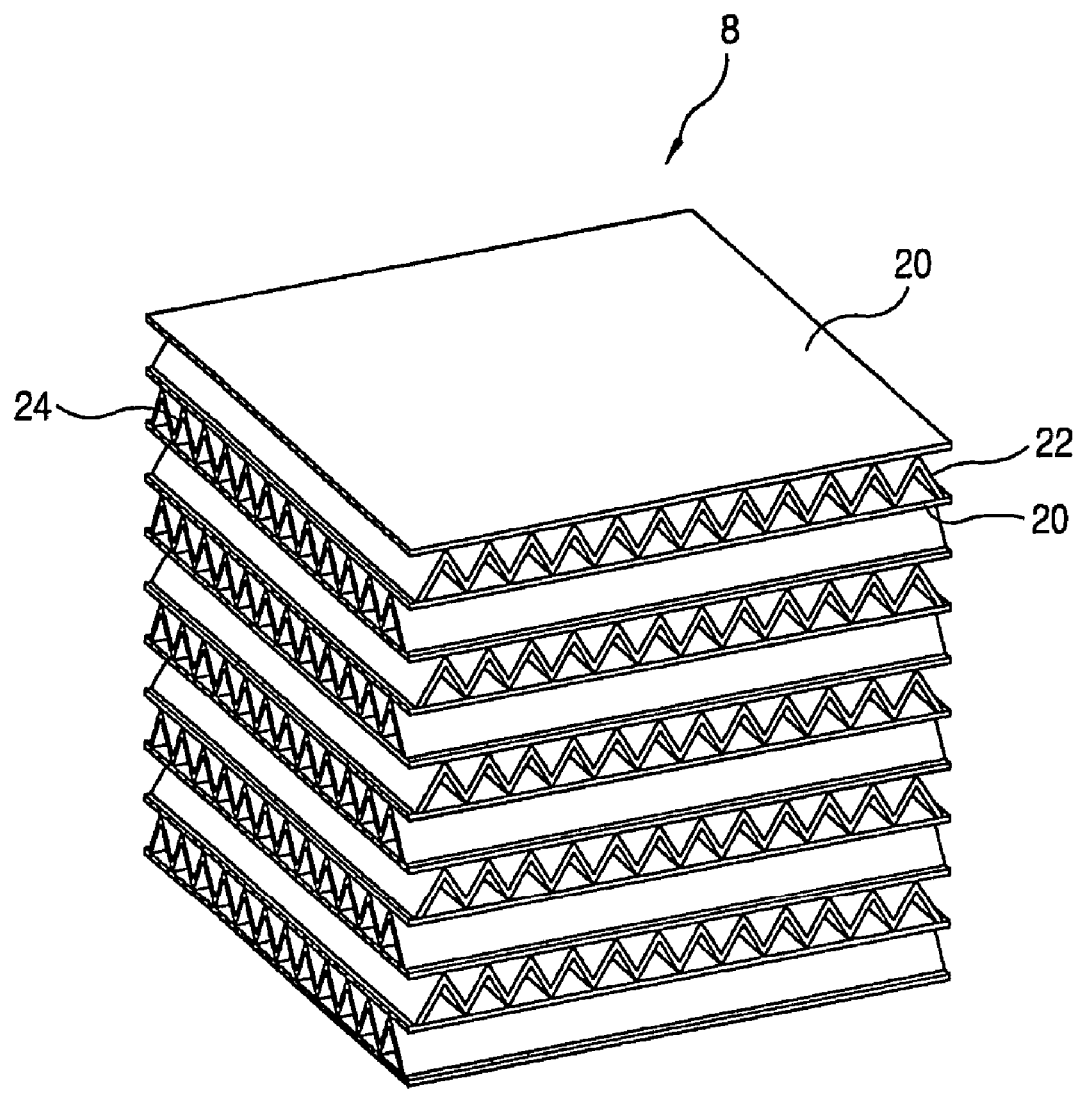
FIG. 2 is a partial perspective view showing a conventional heat exchanger of a ventilating system.
Figure 3:
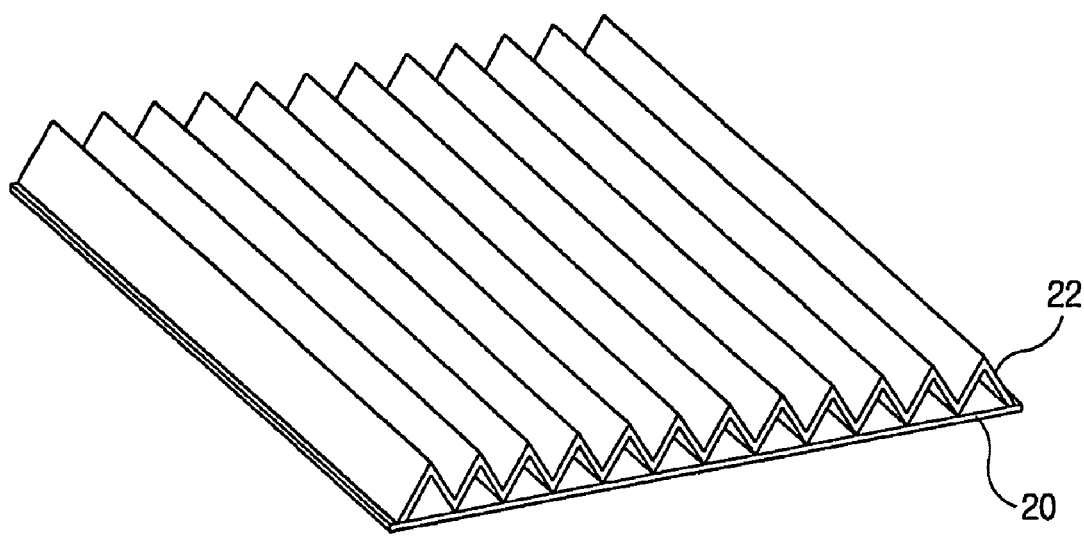
FIG. 3 is a perspective view showing a conventional corrugation plate of the heat exchanger of a ventilating system.
Figure 4:
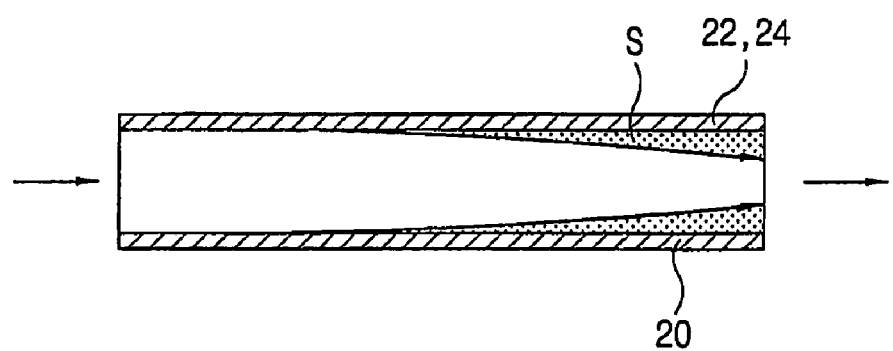
FIG. 4 is a cross-sectional view showing a movement of the air in the pipe to which the conventional heat exchanger of a ventilating system is applied.

With reference to FIG. 1, in the ventilating system in accordance with the present invention, a case 2 is mounted to penetrate a wall which divides the indoor and outdoor, a side surface of the case 2 is positioned indoors and the other side surface is positioned indoors. Here, an outdoor suction hole 10 through which the outdoor air is sucked and an outdoor discharging hole 12 through which the indoor air is discharged are respectively formed on a side surface positioned at the outdoor of the case 2, and an indoor suction hole 16 through which the indoor air is sucked and an indoor discharging hole 14 through which the outdoor air is discharged to the indoor are respectively formed on a side surface positioned at the indoor of the case 2.

A discharging ventilating fan 4 for giving a ventilating pressure for discharging the indoor air to the outdoor is installed in a position connected with the outdoor discharging hole 12 inside the case 2, and a suction ventilating fan 6 for giving a ventilating pressure for sucking the outdoor air to the indoor is installed in a position connected with the indoor discharging hole 14 inside the case 2.

An air cleaner (not shown) for removing foreign materials, dust and the like contained in the outdoor air is installed on the suction channel inside the case 2, and a heat exchanger 8 for transferring heat of the discharged indoor air to the sucked indoor air is installed inside the case 2.

As shown in FIG. 5, the heat exchanger 8 includes heat exchange plates 50 which are laminated in a thin plate shape at a predetermined interval, a plurality of embossing protrusions 54 which are attached on the outdoor air path 52 divided by the heat exchange plates 50, for generating turbulence in the outdoor air which flows in the outdoor air path 52 and a corrugation plate 58 which is positioned in the indoor air path 56 which is at right angles to with the outdoor air path 52 in turn, for securing a space through which the indoor air passes.

A partition 60 for preventing inflow of indoor air into the outdoor air path 52 is attached on the both side surfaces of the heat exchanger 8 through which the outdoor air passes. On the other side surfaces of the heat exchanger 8 through which the indoor air passes are closed by the both side surfaces of the corrugation plate 58, and prevents inflow of the outdoor air.

Figure 6:
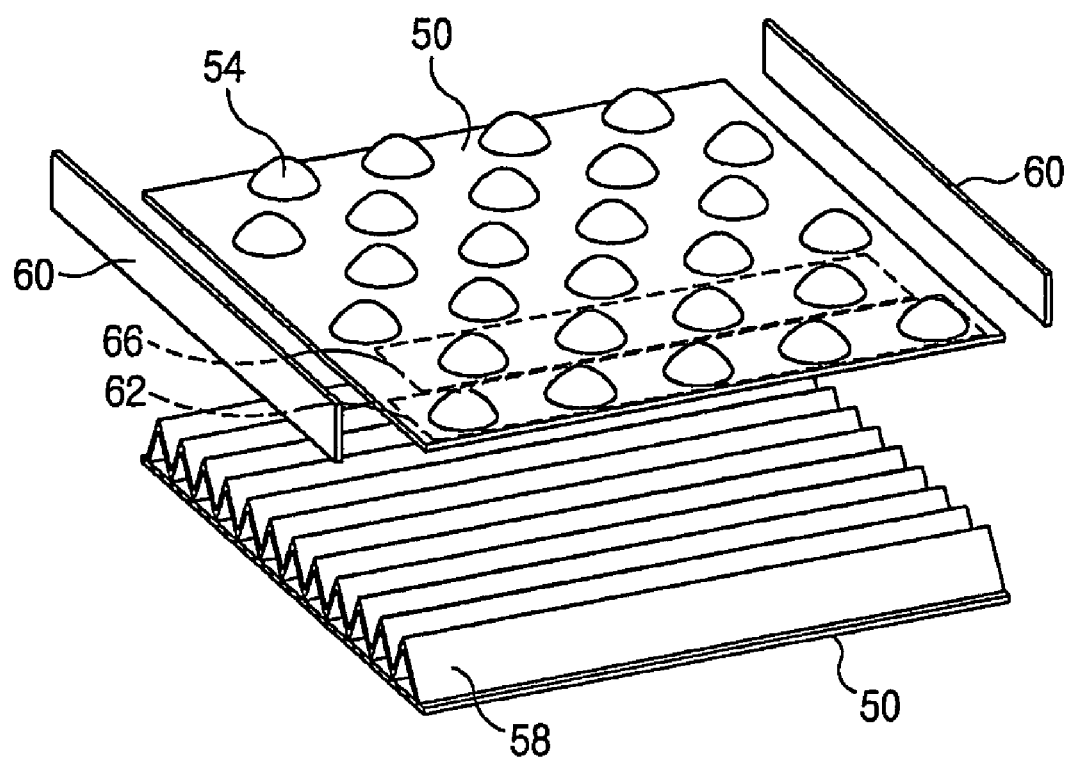
FIG. 6 is a partially resolving perspective view showing the heat exchanger of the ventilating system in accordance with an embodiment of the present invention.

Here, as shown in FIG. 6, the embossing protrusions 54 is formed in a convex shape having a predetermined height on the upper surface of the heat exchange plate 50. The embossing protrusions 62 of a first row are aligned at a predetermined interval at the front of the heat exchange plate 8, the embossing protrusions 66 of a second row are aligned at a predetermined interval at the rear of the embossing protrusions 62 of the first row, and the embossing protrusions 62 and 66 of the first row and the second row are sequentially aligned.

Here, the embossing protrusions 66 of a second row are aligned at a predetermined interval at the rear of the embossing protrusions 62 of the first row so that the embossing protrusions of the second row can be diffused while being collided with the indoor air which passes the space among the embossing protrusions of the first row.

In the corrugation plates 58, waves having a predetermined height are repeatedly formed, and the indoor air passes through the space formed by the wave.

The operation of the heat exchanger in accordance with an embodiment with the above structure will be described.

When the ventilating fan 6 is driven, the outdoor air is sucked through the outdoor suction hole 10, various dusts and foreign materials are removed passing the air cleaner, and the outdoor air is supplied through the indoor discharging hole 14 by passing the indoor air path 52. When the discharging ventilating fan 4 is driven, the indoor air is sucked through the indoor suction hole 16 and is discharged to the outdoor through the outdoor discharging hole 12 by passing the outdoor air path 56.

Here, as the outdoor air passing through the outdoor air path 52 and the indoor air passing through the indoor air path 56 flow while being crossed with each other, heat contained in the indoor air is sucked to the outdoor air through the heat exchange plate 50, and the heat exchanged outdoor air is supplied to the indoor.

In the operation of the heat exchanger, the outdoor air passing through the outdoor air path 52 is irregularly diffused while being collided with the embossing protrusion formed on the outdoor air path 52, and development of the boundary layer is prevented. As the air collided with the embossing protrusions 54 flows in contact with the surface of the heat exchange plate 50, and accordingly, heat transfer performance with the indoor air which passes the corrugation plate 58 formed on the indoor air path 56 can be improved.

Figure 7:
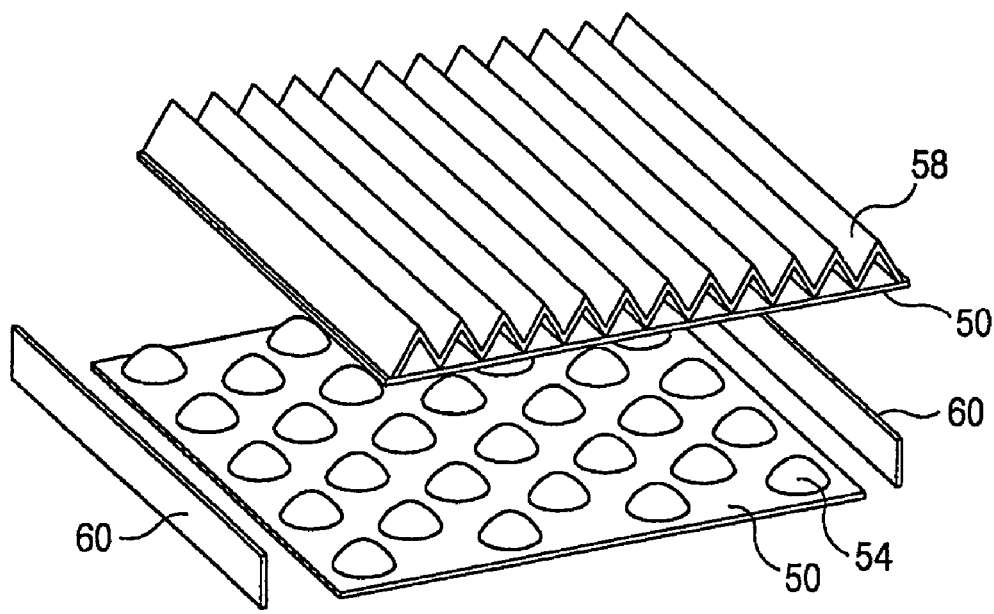
FIG. 7 is a partially disassembled perspective view showing the heat exchanger of the ventilating system in accordance with a second embodiment of the present invention.

FIG. 7 is a partially disassembled perspective view showing the heat exchanger of the ventilating system in accordance with a second embodiment of the present invention.

In the heat exchanger in accordance with the second embodiment, a plurality of heat exchange plates 50 are laminated at a predetermined interval, a corrugation plate 58 having corrugations formed at a predetermined interval is attached on the outdoor air path 52 through which the outdoor air passes among the heat exchange plates 50, and a plurality of embossing protrusions 54 are formed on the indoor air path 56 through which the indoor air passes.

That is, the heat exchanger 50 diffuses indoor air by providing a plurality of embossing protrusions 54 on the indoor air path 56 through which indoor air passes contrary to the above description of the first embodiment, and improves heat exchange performance with outdoor air which passes through the outdoor air path in which the corrugation plate 58 is installed.

Here, the embossing protrusion 54 is selectively provided to one of the indoor air path 56 or the outdoor air path 52 described above, or can be formed on the whole indoor air path 56 and outdoor air path 52. Also, the corrugation plate 58 and embossing protrusion 54 can be irregularly positioned not dividing the indoor and outdoor air paths 56 and 52.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

INDUSTRIAL APPLICABILITY

The heat exchanger of the ventilating system can improve heat transfer performance by controlling development of the boundary layer by attaching a plurality of embossing protrusions on at least one air path of the air paths between an outdoor air path through which outdoor air passes and an indoor air path through which indoor air passes so that the air can be irregularly diffused.

Also, as the heat exchange performance of the heat exchanger, indoor temperature change generated in case of ventilation, and accordingly energy consumption can be reduced. In addition, by maintaining the indoor temperature regularly, more comfortable indoor environment can be made.

The invention claimed is:

1. A heat exchanger of a ventilating system, comprising:
   heat exchange plates which are laminated at a predetermined interval and divide an outdoor air path through which outdoor air passes and an indoor air path through which indoor air passes;
   a plurality of embossing protrusions which are formed on the outdoor air path between two adjacent heat exchange plates, for generating turbulence in the outdoor air which flows in the outdoor air path, the embossing protrusions being located on one of the two adjacent heat exchange plates without being in contact with the other one of the two adjacent heat exchange plates, an entire surface of another one of the two adjacent heat exchange plates in the outdoor air path being substantially flat and facing the embossing protrusions; and
   a corrugation plate which is positioned in the indoor air path, for securing a space through which the indoor air passes.

2. The exchanger of claim 1, wherein a partition for preventing inflow of indoor air into the outdoor air path is attached on both side surfaces of the outdoor air path.

3. The exchanger of claim 1, wherein the embossing protrusions are formed in a convex shape having a predetermined height on the upper surface of the heat exchange plate.

4. The exchanger of claim 1, wherein the embossing protrusions of a first row are aligned at a predetermined interval at the front of the heat exchange plate, embossing protrusions of a second row are aligned at a predetermined interval at the rear of the embossing protrusions of the first row, the embossing protrusions of the first row and the second row are sequentially aligned, and the embossing protrusions of the second row are respectively positioned in spaces among the embossing protrusions of the first row.

5. The exchanger of claim 1, wherein the outdoor air passing through the outdoor air path and the indoor air passing through the indoor air path which flow being crossed with each other.

6. The exchanger of claim 1, wherein the one of the two adjacent heat exchange plates outside of an area occupied by the embossing protrusions is substantially flat.

7. A heat exchanger of a ventilating system, comprising:
- a heat exchange plate for dividing an outdoor air path through which outdoor air passes and an indoor air path through which indoor air passes, which are laminated at a predetermined interval;
- a corrugation plate which is attached on the outdoor air path for securing a space through which the outdoor air passes; and
- a plurality of embossing protrusions which are positioned in the indoor air path between two adjacent heat exchange plates, for generating turbulence in the indoor air flowing in the indoor air path, the embossing protrusions being located on one of the two adjacent heat exchange plates without being in contact with the other one of the two adjacent heat exchange plates, an entire surface of another one of the two adjacent heat exchange plates in the indoor air path being substantially flat and facing the embossing protrusions.

8. The exchanger of claim 7, wherein partitions for preventing inflow of outdoor air to the indoor air path are respectively disposed on both side surfaces of the indoor air path.

9. The exchanger of claim 7, wherein the embossing protrusion is formed in a convex shape having a predetermined height on an upper surface of the heat exchange plate.

10. The exchanger of claim 7, wherein the embossing protrusions of a first row are aligned at a predetermined interval at the front of the heat exchange plate, the embossing protrusions of a second row are aligned at a predetermined interval at the rear of the embossing protrusions of the first row, the embossing protrusions of the first and second rows are sequentially aligned, and the embossing protrusions of the second row are positioned in spaces among the embossing protrusions of the first row.

11. The exchanger of claim 7, wherein the outdoor air passing through the outdoor air path and the indoor air passing through the indoor air path which flow being crossed with each other.

12. The exchanger of claim 7, wherein the one of the two adjacent heat exchange plates outside of an area occupied by the embossing protrusions is substantially flat.

13. A heat exchanger of a ventilating system, comprising:
- heat exchanging plates which are laminated at a predetermined interval for dividing an outdoor air path through which outdoor air passes and an indoor air path through which indoor air passes;
- a plurality of outdoor embossing protrusions which are formed on the outdoor air path between two adjacent heat exchange plates, for generating turbulence in the outdoor air which flows in the outdoor air path, the outdoor embossing protrusions being located on one of the two adjacent heat exchange plates without being in contact with the other one of the two adjacent heat exchange plates, the one of the two adjacent heat exchange plates outside of an area occupied by the outdoor embossing protrusions being substantially flat, an entire surface of another one of the two adjacent heat exchange plates the outdoor air path being substantially flat and facing the outdoor embossing protrusions; and
- a plurality of indoor embossing protrusions which are formed in the indoor air paths, for generating turbulence in the indoor air which flows in the indoor air path.

* * * * *